UNITED STATES PATENT OFFICE.

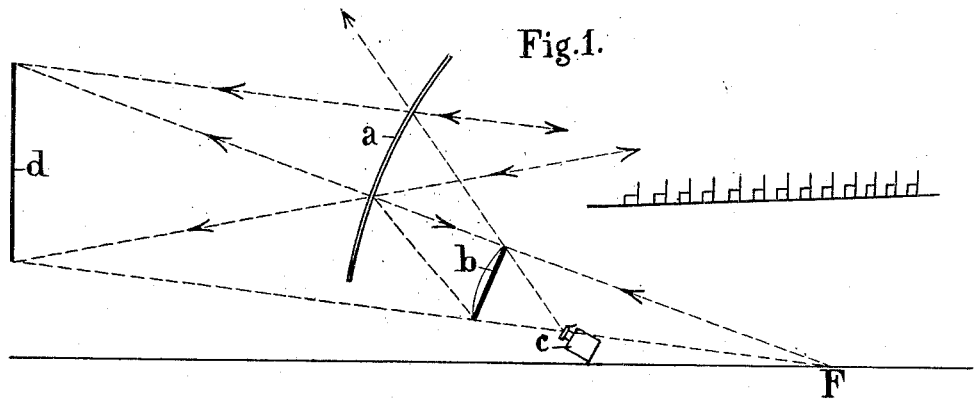
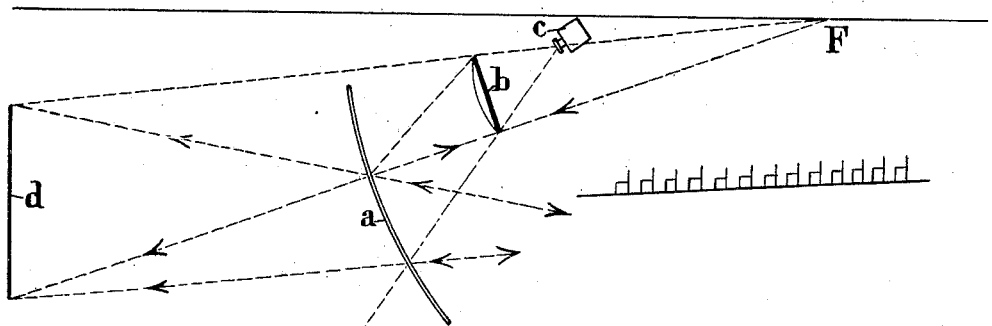
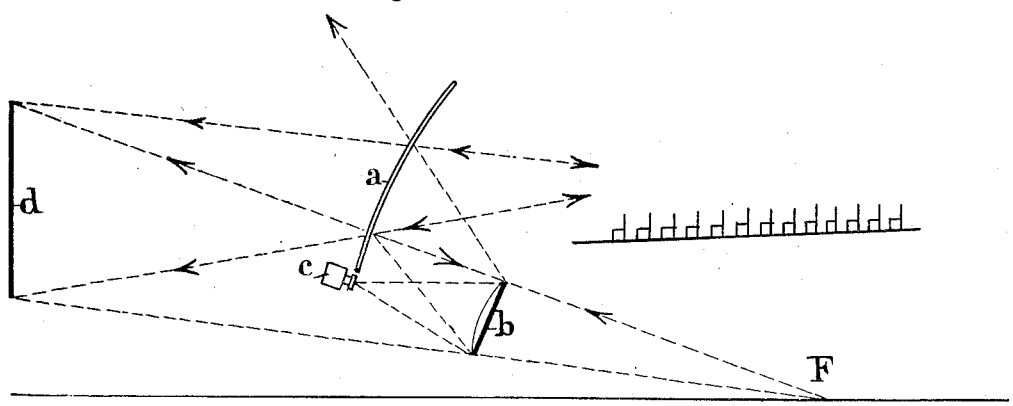

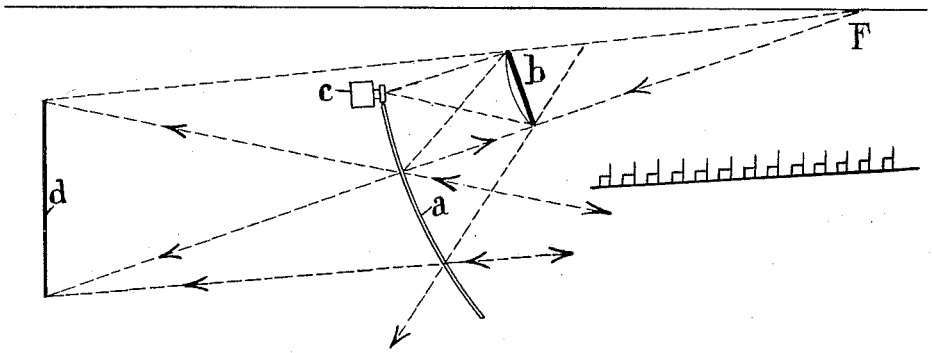
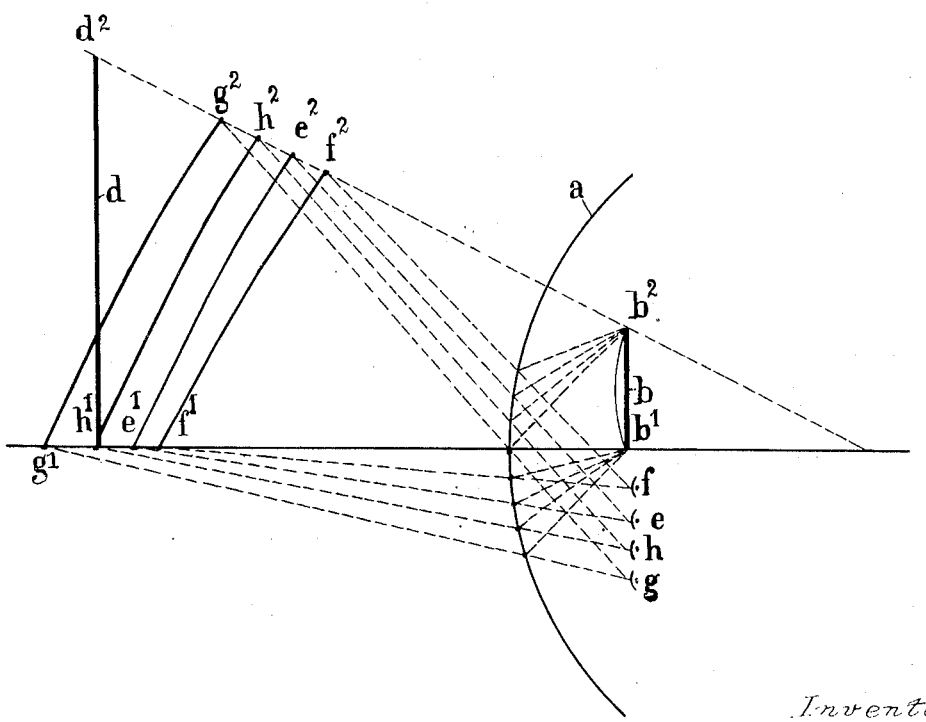

FREDERIC LEHNHOFF-WYLD, OF PARIS, FRANCE.

DEVICE TO OBTAIN STEREOSCOPIC EFFECTS IN CINEMATOGRAPHIC PROJECTIONS.

1,419,901.   Specification of Letters Patent.   Patented June 13, 1922.

Application filed January 21, 1920. Serial No. 353,026.

*To all whom it may concern:*

Be it known that I, FREDERIC LEHNHOFF-WYLD, of 92 Rue Michel-Ange, Paris, France, have invented a Device to Obtain Stereoscopic Effects in Cinematographic Projections (for which I have filed an application in France, January 15, 1919), of which the following is a clear, full, and exact description.

The subject of the present invention is a device permitting of obtaining stereoscopic effects in cinematographic projections, and is characterized essentially by the fact that the image presented to the observers is projected by a suitable projecting apparatus on a convex and inclined screen which is reflected on a spherical mirror equally inclined; said convex screen, transparent or opaque, being arranged between the focus and the center of the concave mirror and permitting of obtaining a true enlarged luminous image, not reversed (inverted) and free from all distortions projected on the convex screen.

In accordance with this invention, use is made, for the obtainment of cinematographic images with stereoscopic effects, of certain properties of the spherical mirrors which are otherwise considered as defects in the construction of some optical apparatus, such as telescopes, and the like.

For the same purpose, use is also made of the deformation of the image produced by the relatively considerable distance separating the screen from the axis of the mirror. For obtaining the rectification, that is the vertical aspect of the image reproduced in these conditions, the luminous image is suitably inclined to the vertical plane.

In this manner, an enlarged virtual image is obtained, the stereoscopic effect of which results: from the strong deformation of the image in relation to the distance separating the screen from the axis of the mirror; from the lack of similitude of the image simultaneously seen by both eyes and from the different distortions given to the image by the spherical mirror.

The accompanying drawings diagrammatically illustrate, by way of example, two methods of application of the device forming the subject-matter of the invention.

Fig. 1 shows an arrangement in which the transparent screen as well as the projection apparatus are arranged below the plane of the spectators;

Fig. 2 illustrates an arrangement in which the transparent screen and the projection apparatus are located above the spectators;

Figs. 3 and 4 relate to another arrangement in which the screen is opaque. In Fig. 3, this screen and the projection apparatus are located below the spectators, whilst in Fig. 4 they are arranged above the latter.

Fig. 5 is a theoretical view indicating how the image reflected according to the above mentioned principle is seen from different points of observation, by both eyes of an observer, for instance.

As will be seen in Figs. 1 to 4, the present device substantially comprises: an inclined spherical mirror $a$, a transparent or opaque screen $b$ and a projection apparatus $c$ of any suitable type.

The inclination of the spherical mirror $a$ is determined in such manner that its main axis approximately forms the bisector of an angle, determined by a radius corresponding to the plane of the spectators and ending at the centre of the mirror $a$ and by a second radius, starting from the latter point and ending at the centre of the luminous image formed on the screen $b$.

These relations, as well as the focal distance of the mirror, are of course given only by way of indication and may be modified according to the available room and premises.

Moreover, it will be noted, in these figures, that the transparent or opaque screen $b$ is always arranged between the focus F and the centre of the mirror $a$, so as to produce by reflection on the latter, an enlarged and noninverted virtual image $d$ of the luminous scene projected by the projection apparatus $c$ on the screen $b$, whether the latter be transparent as in Figs. 1 and 2, or opaque as in Figs. 3 and 4.

In case the screen is opaque, Figs. 3 and 4, it is necessary to rectify the image in the lateral direction; the projection apparatus $c$ is, in this case, arranged, relatively to the screen $b$, on the same side as the mirror $a$ with a rectifying prism.

The position of the transparent or opaque screen relatively to the spectators may be modified according to the circumstances and to the space available; the said screen may be arranged either below the spectators (Figs. 1 and 3) or above as in Figs. 2 and 4 and on either side.

The stereoscopic effect is more particularly produced when observing an image, such as $d$, by the lack of similitude of the images simultaneously seen by both eyes, but different for each eye considered separately.

To each point of the screen object and for each eye correspond two small focal lines; the geometrical locations of their middle-points constitute two different images of the screen object; the stereoscopic effect depends on the preponderance taken by one or the other of these images for each eye, preponderance which is the result of a psychological and unconscious action of selection.

By referring to Fig. 5, if we suppose, for instance, a screen $b$ and a spherical mirror $a$ arranged as above mentioned, so as to obtain an enlarged virtual image $d$ of the scene projected on the screen, it will be understood that a spectator the eyes of whom are indicated at $e\ f$ will see that image in the following manner:

The left eye $e$ sees the left end $b^1$ of the horizontal image at $e^1$ and the right end $b^2$ of the same image at $e^2$.

The right eye $f$ of the spectator sees the same points $b^1$ and $b^2$ of the image at $f^1$ and $f^2$ respectively.

It will be understood that the image simultaneously observed by each of the eyes of the spectator differ on several points. First, the images $e^1\ e^2$, $f^1\ f^2$ do not occupy the same plane, the image $e^1\ e^2$ being farther away from the observer than the image $f^1\ f^2$; moreover, this image $f^1\ f^2$ which is nearer, occupies a more open visual angle and appears enlarged.

In fact, on this figure, the transverse dimensions are enlarged by the stronger dispersion of the rays coming from $b^2$ and falling on the mirror nearer its edge.

The deformation resulting therefrom for the reflected image, increases as one approaches its end $f^2$ and is greater than that produced at $e^2$.

Both images $e^1\ e^2$, $f^1\ f^2$ differ therefore more and more as the distance from the centre of the mirror increases and they do not overlap at all at $f^2$.

In this way the stereoscopic parallax necessary for the vision in relief is obtained.

Considerations similar to those above established for the visual points $e\ f$ may also be determined for other points of the mirror $a$ or for other visual points $g\ h$ giving the impression of the respective images $g^1\ g^2$ and $h^1\ h^2$ corresponding to the sides $b^1\ b^2$ of the screen $b$, simultaneously observed by two visual rays starting from $h$ and $g$.

The distortion given by the mirror to the reflected images causes the ends $d^2$ of a square image $d$ (supposed to be aplanatic) to be transferred, for instance at $h^2$ (Fig. 5). If, as stated, we consider a square surface, the edges of the image and especially its four angles will be enlarged and drawn nearer the observer; as far as relief is concerned, we thus obtain an advantage which may still be increased by suitably inclining the plane of the luminous image. The edges of the images will thus appear as moving towards the observer which will largely contribute to give the effect of relief sought for by creating the sensation of distance.

The lack of coincidence of the two retinal images, which is one of the causes of the stereoscopic effect, gives another result when the dissimilitude regards not only the enlargement and size of the images, but more specially the lack of coincidence of the planes they occupy, as well as of their lights and shades.

In this case, the luminous and shaded portions which do not exactly overlap give the impression of the shining reflex, characteristic of metallic objects, polished surfaces, water surfaces and the like, and this sensation of lustre gives finally to the reproduction of the views obtained according to the above described device, their absolutely natural aspect and character. The optical illusion is completed by other causes, arising from a special effort of accommodation and coordination.

In the above described device, the image seen in the spherical mirror presents a deformation of the horizontal lines which incline, more or less, at their ends, towards the side where the screen is located.

For correcting this defect, the screen instead of being plane as described, may posses a curved surface, which surface constitutes a surface of revolution either spherical, ovoid, conical, or the like, according to the position of the screen.

This correction can also be effected by placing a suitably calculated lens in front of the projection apparatus or in front of the screen.

The application of the above device to entertainment halls, is obviously given only by way of example and it will be understood that, without departing from the scope of this invention, the forms, materials and sizes of the mirror and screen may be modified according to the various conditions of application and to the available space, the sizes of these various parts might be, for instance, sufficiently reduced for allowing the constitution of a device capable of being used in a drawing room for the production of stereoscopic effects in the same conditions as those above set forth.

Claim:

A device for obtaining stereoscopic effects in cinematographic projections comprising in combination, a spherical inclined mirror, a screen arranged between the focus and the center of the mirror, a projecting apparatus, said screen being suitably inclined to reflect on the concave mirror the image projected by said apparatus and to obtain a true and large and not reversed image of the scene projected on the screen, said screen having a convex surface to correct the deformations of the horizontal lines and other distortions of the image projected.

The foregoing specification of my device allowing to obtain stereoscopic effects in cinematographic projections in black and in colors, signed by me this 31st day of December, 1919.

FREDERIC LEHNHOFF-WYLD.